United States Patent Office 3,804,925
Patented Apr. 16, 1974

3,804,925
ACRYLIC RESINOUS COMPOSITION AND PROCESS THEREFOR FROM A 3 - STAGE EMULSION POLYMERIZATION SYSTEM
Tetsuji Kato, Mikio Izumi, and Kazuhiko Morifuji, Otake, Japan, assignors to Mitsubishi Rayon Company Limited, Tokyo, Japan
No Drawing. Filed Mar. 12, 1971, Ser. No. 123,832
Claims priority, application Japan, Apr. 3, 1970, 45/28,443; Mar. 18, 1970, 45/22,956; Dec. 28, 1970, 45/120,406
Int. Cl. C08f 15/00, 19/00
U.S. Cl. 260—885
10 Claims

ABSTRACT OF THE DISCLOSURE

An acrylic resinous composition consisting essentially of fixed proportions of three polymer or copolymer components (A), (B) and (C). Component (A) contains no less than 60% of alkyl acrylate and exhibits a 3–15 swelling degree and a no less than 80% gel content. Components (B) and (C) are prepared by polymerizing a mixture of 10–60% alkyl acrylate and 40–90% alkyl methacrylate in the presence of component (A) and an alkyl acrylate monomer or a mixture containing no less than 60% of alkyl methacrylate in the presence of components (A) and (B), respectively. The resinous composition is suitable for films possessing an attractive appearance and an excellent weather resistance and impact strength.

---

This invention relates to a resinous composition having improved weather resistance and a film manufactured therefrom.

It is widely known that polymers of acrylic acid ester or methacrylic acid ester, particularly of methyl methacrylate, present a very attractive appearance and an excellent weather resistance. They are however, inferior in mechanical properties such as impact resistance. For example, polymethyl methacrylate films, in the case where they have not been subjected to drawing, are too fragile to handle as a film or thin sheet. In order to give an impact resistance, it has been heretofore proposed to incorporate rubber materials into the acrylic polymer. However, the incorporation of rubber material often results in films possessing a poor appearance and an extremely deteriorated weather resistance. Acrylic films which combine a good appearance and weather resistance with mechanical strength such as impact strength, have not been obtainable.

An object of this invention is therefore to provide a resinous composition which are particularly suitable for the production of film or sheet-like shaped articles combining an attractive appearance and an excellent weather resistance with improved mechanical strength.

Another object of this invention is to provide film or sheet-like shaped articles possessing such excellent properties.

Other objects and advantages of this invention will become apparent from the following description.

According to this invention, we provide an acrylic resinous composition consisting essentially of (A) 5 to 35% by weight based on the weight of said resinous composition, of a polymer or copolymer component containing in polymerized form 60 to 100%, preferably 80 to 100%, by weight of at least one alkyl acrylate, the alkyl group having 1 to 8 carbon atoms, and 0 to 40%, preferably 0 to 20%, by weight of at least one copolymerizable monofunctional vinyl or vinylidene monomer, and being cross-linked with a cross-linking agent to the extent of exhibiting a swelling degree of 3 to 15 and a gel content of no less than 80%, (B) 1 to 70%, preferably 5 to 50%, by weight, based on the weight of said resinous composition, of a copolymer component being prepared by polymerizing a mixture of 10 to 60%, preferably 20 to 60%, by weight of at least one alkyl acrylate, the alkyl group having 1 to 8 carbon atoms, 40 to 90%, preferably 40 to 80%, by weight of at least one alkyl methacrylate, the alkyl group having 1 to 4 carbon atoms, and 0 to 20% by weight of at least one copolymerizable vinyl or vinylidene monomer in the presence of said polymer or copolymer component (A), and (C) The remainder of a polymer or copolymer component being prepared by polymerizing a mixture of 60 to 100%, preferably 85 to 100%, by weight of at least one alkyl methacrylate, the alkyl group having 1 to 4 carbon atoms, and 0 to 40%, preferably 0 to 15%, by weight of at least one copolymerizable monofunctional vinyl or vinylidene monomer in the presence of both said polymer or copolymer component (A) and said copolymer component (B).

The terms "gel content" and "degree of swelling," used in the specification, mean those which are determined as follows: A cross-linked acrylic acid ester polymer component (A) (an air-dried weight of which is referred to as $W_0$) is immersed in about a 150-fold amount of methyl ethyl ketone in relation to the polymer component (A). After being left for 24 hours, a weight of the swelled polymer (referred to as $W_1$) and then, an absolute dry weight thereof (referred to as $W_2$) are measured. Gel content and degree of swelling are calculated from the following equations;

$$\text{Gel content (GC)} = \frac{W_2}{W_0} \times 100 \text{ (percent)}$$

$$\text{Degree of swelling (DS)} = \frac{W_1 - W_2}{W_2}$$

A cross-linked acrylic acid ester elastomer component (A) of this invention is characterized as containing no less than 60% by weight of at least one alkyl ester of acrylic acid in polymerized form, which alkyl group has 1 to 8 carbon atoms, and being cross-linked to the extent of exhibiting a swelling degree of 3 to 15 and a gel content of no less than 80%. When an elastomer component (A) has cross-linkages in the extent being out of the above range, transparent film or sheet-like shaped articles, which are superior in weather resistance, impact resistance, surface luster and processability, can hardly be obtained therefrom.

That is to say, in the case where an elastomer component (A) has no or has insignificant amounts of cross-linkage, that is, only in the extent of exhibiting a gel content of less than 80% and/or a degree of swelling in excess of 15, the component (A) exhibits the following drawbacks; elastomer particles contained in a resinous composition have a tendency to agglomerate each other or to be transformed in conformity with the flow direction of the resin in a shaping process. This causes deterioration of the external appearance of films, i.e., surface luster and transparency and thus depreciation of their value as commodities. Further, it causes lack of uniformity in physical properties such as tearing strength, tensile strength, elongation and impact strength and deterioration of weather resistance.

On the contrary, in the case of a degree of cross-linking being too high, i.e., in the extent of exhibiting a degree of swelling of less than 3, the component (A) offers no problem as to external appearance, but causes considerable depreciation of elongation and impact strength.

Methods of preparing such cross-linked acrylic acid ester elastomer components (A) having a gel content of no less than 80% and a swelling degree of 3 to 15 are illustrated below.

The methods are divided broadly into three types. The first type is as follows:

Peroxides, preferably oil-soluble organic peroxides such as benzoyl peroxide, lauroyl peroxide, 2,4-dichlorobenzoyl peroxide and the like are incorporated into the reaction mixture, as cross-linking agents. More particularly, 0.3 to 3.0 parts by weight of peroxide is added and then, uniformly dissolved in 100 parts by weight of monomer or a monomer mixture while the mixture is maintained at such temperatures that the peroxide does not substantially decompose. The mixture is then polymerized in a medium of an aqueous solution containing a water-soluble redox initiator and an emulsifier at such temperatures that the peroxide does not substantially decompose, preferably less than 40° C.

Redox initiators to be used herein should be soluble in water. Such redox initiator combinations include, for example, hydrogen peroxide-ferrous salt, potassium persulfate-sodium thiosulfate, potassium persulfate-acid sodium sulfite, ammonium persulfate-acid sodium sulfite and the like.

Polymerization time varies with the particular catalysts system, amounts of catalysts, polymerization temperature, etc., but normally is within a range of 2 to 10 hours. At the time of the completion of polymerization, peroxide, which has been initially added to the reaction mixture, remains almost undecomposed in a uniformly dispersed state in polymer particles.

Thereafter, the resultant polymer latex is heated to temperatures exceeding a decomposition point of the peroxide, preferably to those of more than 70° C., at which temperatures the peroxide decomposes in polymer latex particles and forms bridges between the polymer molecules. By suitably adopting the particular peroxide, added amounts of peroxide and a heating temperature and time, the desired cross-linked polymer components (A) which are characterized as having a gel content of no less than 80% and a swelling degree of 3 to 15 can easily be obtained. In order to effect the cross-linking in polymer latex, the redox polymerization should be performed at such temperatures that peroxide does not substantially decompose.

In a preferred embodiment of the method, polymerization is performed while a monomer or a monomer mixture, containing an organic peroxide, is continuously or intermittently added to the reaction system.

The second type method for preparing cross-linked acrylic acid ester elastomer components (A) is a follows; a monomer or a monomer mixture is polymerized in an aqueous medium containing initiators and an emulsifier, first, to form uncross-linked elastomer latex. As the reaction mixture contains no peroxide, there is no need to perform polymerization at particularly low temperatures in the presence of redox initiators, which conditions are needed in the above first type method. Thus, the polymerization may be performed at temperatures of 60 to 100° C. by an emulsion polymerization method using normal water-soluble initiators such as potassium persulfate, ammonium persulfate and the like.

Polymerization time varies with the particular catalyst system, amounts of catalyst, polymerization temperature, etc., but normally is within a range of 1.5 to 10 hours. After the polymerization is completed, a solution of peroxide cross-linking agents, preferably oil-soluble organic peroxides as exemplified above, in a solvent of the type being insoluble in water but capable of dissolving acrylic acid ester elastomers is added to the elastomer latex. Added amounts, by weight, of peroxide are 0.3 to 3.0 parts to 100 parts of the elastomer latex. The mixture was thoroughly stirred to uniformly diffuse and disperse the solvent and peroxide into elastomer latex particles.

Then, the mixture is heated to temperatures exceeding a decomposition point of the peroxide in a similar manner as that in the above first type of methods to form bridges between the polymer molecules.

Solvents to be used herein include, for example, benzene, methyl ethyl ketone, monomers to be used as raw materials for the acrylic acid ester elastomer, etc. Used amounts of the solvent are preferably 5 to 10 parts by weight to 0.3 to 3.0 parts of peroxide, which are the minimum required amounts for thoroughly dissolving the peroxide and uniformly dispersing the same into the elastomer latex. The use of solvent in excess of 10 parts by weight to the peroxide is not preferred; it sometimes results in the formation of undesired mass-like polymers during a cross-linking process. In the case where monomers are used as solvent, monomers may be added together with peroxide to an aqueous medium and stirred and then, heated to effect polymerization by the action of peroxide simultaneously with cross-linking; or after monomers containing peroxide are dispersed in an aqueous medium, polymerization may be performed in the presence of water-soluble redox catalysts and thereafter, cross-linking may be effected.

By suitably adopting the particular peroxide, added amounts of peroxide and a heating temperature and time, the desired cross-linked elastomer latex, which are characterized as having a gel content of no less than 80% and a degree of swelling of 3 to 15, can easily be obtained.

Compared to the first type method, the second type method has an advantage of there being no need to strictly regulate the polymerization temperature since the polymerization mixture contains no peroxide.

The third type method is as follows:

0.2 to 15 parts by weight of at least one polyfunctional monomer having two or more non-conjugated $>C=C<$ groups in the molecule is added, as a cross-linking agent, to 100 parts by weight of monomer or a monomer mixture. The resultant mixture is polymerized under emulsion state.

Such polyfunctional monomers include, for example, ethylene glycol dimethacrylate, triethylene glycol dimethacrylate, tetraethylene glycol dimethacrylate, trimethylolpropane trimethacrylate, allyl acrylate, diallyl phthalate, divinylbenzene, triallyl cyanurate, triallyl phosphate, triallyl isocyanurate and the like. Among these monomers, dimethacrylate monomers and divinylbenzene do not produce the desired effect unless they are used in a greater amount, and therefore they should preferably be used together with the other polyfunctional monomer. The use of polyfunctional monomers in excess of the above range is not preferred; it results in elastomer components (A) having a degree of swelling of less than 3.

Initiators to be used in the polymerization are not critical and include, for example, water-soluble catalysts such as potassium persulfate, ammonium persulfate; etc.; water-soluble redox catalysts such as hydrogen peroxide-ferrous salt, potassium persulfate-sodium thiosulfate, potassium persulfate-acid sodium sulfite, ammonium persulfate-acid sodium sulfite; and oil-soluble redox catalysts such as cumene hydroperoxide-sodium metabisulfite ($Na_2S_2O_5$), t-butyl peracetate-sodium dithionate ($Na_2S_2O_6$), cumene hydroperoxide-sodium formaldehyde sulfoxylate, etc. Polymerization time varies with the particular catalyst, amounts of catalysts, polymerization temperatures, etc., but normally is within a range of 1.5 to 10 hours.

The third type method is advantageous in the point that it provides elastomer component (A) having particularly high weather resistance without reducing the productivity, in comparison with those wherein peroxide is used. A combination of, for example, both first and third type methods may also be applied in the invention, which has such an advantage, that used amounts of polyfunctional monomers may be reduced in comparison with the third type method.

Cross-linked acrylic acid ester elastomer (A), thus obtained, is a rubber-like material which is soft at room temperature. The elastomer (A) contains in polymerized form, 60 to 100%, preferably 80 to 100%, by weight of alkyl acrylate, the alkyl group having 1 to 8 carbon atoms, and 0 to 40%, preferably 0 to 20%, by weight of other copolymerizable monofunctional vinyl or vinylidene monomers.

The alkyl acrylates include, for example, methyl acrylate, ethyl acrylate, propyl acrylate, butyl acrylate, 2-ethylhexyl acrylate. In the preparation of the elastomer (A), such alkyl acrylate monomers may be used alone or together with each other or as a combination with other copolymerizable monofunctional vinyl or vinylidene monomers.

Such vinyl or vinylidene monomers includes, for example, methacrylic acid and alkyl methacrylate, the alkyl group having 1 to 12 carbon atoms; dialkyl itaconate, the alkyl group having 1 to 10 carbon atoms; acrylonitrile; methacrylonitrile; vinylidene chloride; vinyl chloride; styrene and styrene derivatives having one or more alkyl substituents in the nucleus or the α-position, such as o-, m- and p-methylstyrene and α-methylstyrene; and their mixtures. Most preferable monomers are alkyl methacrylate, styrene and acrylonitrile.

Emulsifiers to be used in the preparation of elastomer components (A) may be those which are of the well-known type and ordinarily used in the emulsion polymerization of acrylates or methacrylates. For example, higher fatty acid salts and sulfonic acid salts, dialkyl sulfosuccinate, polyoxyethylene alkyl phenyl ether, etc. are enumerated. Elastomer (A) latex having particle diameters ranging from 500 to 5,000 A. may be obtained by adopting the particular emulsifier, used amounts of an emulsifier or adding a monomer or a monomer mixture continuously to the reaction system.

Resinous compositions suitable for the production of transparent films, which are superior in weather resistance, impact resistance, surface luster and processability, are not obtainable only by physically blending the cross-linked acrylic acid ester elastomer component (A) with other thermoplastic polymer resins because of lack of compatibility. Therefore, according to this invention, a resinous composition consisting essentially, by weight, of 5 to 35% of an elastomer polymer or copolymer component (A), 1 to 70%, preferably 5 to 50%, of a copolymer component (B) and the remainder of a polymer or copolymer component (C) is prepared by polymerizing a mixture of 10 to 60%, preferably 20 to 60%, by weight of at least one alkyl acrylate, the alkyl group having 1 to 8 carbon atoms, 40 to 90%, preferably 40 to 80%, by weight of at least one alkyl methacrylate, the alkyl group having 1 to 4 carbon atoms, and 0 to 20% by weight of at least one copolymerizable vinyl or vinylidene monomer in the presence of the component (A) and thereafter, polymerizing a mixture of 60 to 100%, preferably 85 to 100%, by weight of at least one alkyl methacrylate, the alkyl group having 1 to 4 carbon atoms, and 0 to 40%, preferably 0 to 15%, by weight of at least one copolymerizable monofunctional vinyl or vinylidene monomer in the presence of both components (A) and (B).

In polymerization stages for preparing the components (B) and (C), it is not preferred to create fresh polymer particles. Therefore, the addition of an emulsifier is not preferred, but an initiator may be added. Oil-soluble type initiators are preferable. In order to effect the polymerization at a medium temperature, redox catalysts may be used such as cumene hydroperoxide-sodium metabisulfite ($Na_2S_2O_5$), t-butyl peracetate-sodium dithionate ($Na_2S_2O_6$), cumene hydroperoxide-sodium formaldehyde sulfoxylate and the like. Water-soluble initiators may be used, although not preferred as much.

A chain transfer agent may be used in amounts of 0.01 to 2.0 parts by weight based on 100 parts by weight of a monomer mixture in the stages of preparing components (B) and/or (C). The use of a chain transfer agent provides some advantages, listed below; the use of same makes it possible to curtail the amount of catalysts. Consequently, (1) it results in films possessing a more improved weather resistance because the less residual catalysts in polymers lead to the less depreciation of weather resistance, and (2) improve the productivity because a monomer mixture is capable of being added to the reaction system within a short period of time. Further, (3) the resultant resin does not give off an offensive odor in a shaping process, e.g. into films.

Suitable chain transfer agents are, for example, alkyl mercaptan, the alkyl group of which has 2 to 20 carbon atoms; mercapto esters such as alkyl thioglycollate, the alkyl group of which has 2 to 12 carbon atoms, and alkyl mercaptopropionate, the alkyl group of which has 2 to 12 carbon atoms; mercapto acids such as thioglycollic acid and 2-mercaptopropionic acid; benzyl mercaptan; thiophenol and the like. The most preferable is alkyl mercaptan having 4 to 12 carbon atoms.

The preparation of components (B) and (C) is preferably carried out by a continuously adding polymerization method, i.e., while monomer or a monomer mixture is continuously added to the reaction mixture over a long period.

As to the component (C), it should be noted that the component (C) must exhibit a glass transition temperature of no less than 50° C., which is essential to obtain films or sheets possessing a superior antiblocking property in their use.

Further, 0.1 to 40% by weight, based on the weight of the acrylic resinous composition, of vinylidene fluoride polymers may be incorporated into the acrylic resinous composition. The resulting resinous composition has an advantage that it results in film and other shaped articles possessing a more improved impact strength and weather resistance and a more attractive appearance comparing to those manufactured from only the acrylic resinous composition.

As vinylidene fluoride polymers, a homopolymer is preferable, but vinylidene fluoride copolymers containing minor amounts, e.g. 10% by weight or less, of a copolymerizable monomer may be incorporated into the acrylic resinous composition. Such copolymerizable monomers include, for example, sym-dichlorofluoroethylene, 1,1,2-trifluoro-2-chloroethylene, tetrafluoroethylene, vinyl fluoride, vinyl chloride and other ethylene halides.

Mixed proportions of vinylidene fluoride polymers to the acrylic resinous composition are critical, that is, should be within the range of 0.1 to 40% by weight based on the weight of the acrylic resinous composition, in order to obtain products possessing the desirable quality. Most preferably, the proportions are within the range of 5 to 20% by weight. Only a very small amount, i.e. 0.1% by weight, of vinylidene fluoride polymer should be present in the resinous composition in order for at least a small amount of benefit, such as the improvement of impact strength and weater resistance, to be obtained. On the other hand, the use in excess of the upper limit results in shaped articles possessing a deteriorated appearance, or a poor processability or adhesive property.

Apparently the particular manner whereby vinylidene fluoride polymers is incorporated into the acrylic resin is not critical. Vinylidene fluoride polymers may preferably be physically mixed with the acrylic resin while both materials are heated together above their softening points, preferably at temperatures of 150 to 260° C. For example, they may be mixed together by kneading between heated rolls of such a type as widely used in milling of rubber materials, by a screw extruder wherein both shearing and compressive forces act on the mixture at the same time, or by other suitable physical mixing means, e.g. a Banbury mixer.

Apparently the particular manner whereby the resinous composition of the invention is shaped into films, sheets and the like is not critical. The resinous composition can be shaped into transparent films or sheets in normal manners, for example, a T-die method, an inflation method or a calender method. If desired, dyes or pigments, stabilizers and other additives, e.g. for improving the processability, may be incorporated into the resinous composition. After shaping, films or sheets may be printed with any patterns, e.g. a wood grain-like appearance for ornamental purposes.

As films or sheets, manufactured from the resinous composition, possess superior weather resistance, impact resistance and surface luster, they have a universal use. For example, the film or sheet may be laminated with other similar films or sheets and further, the film or sheet or the resulting laminate may be laminated to wood or metal material by means of press rolls or other suitable means and, if desired, using adhesives. Thus, the film or sheet forms external layers of various structures, particularly to be required of superior weather resistance, to achieve an ornamental and protective effect. As methods for preparing such film or sheet laminates, normal methods such as a simultaneous extruding method, an extrusion-coating method, an extrusion-laminating method, a hot melt-laminating method, a wet- or dry-adhesion method, an emulsion-coating method and the like are applicable in place of the press roll means.

The invention will be further illustrated with reference to examples, in which "parts" and "percent" are both "by weight."

EXAMPLE 1

Preparation of cross-linked acrylate elastomer polymer or copolymer components (A)–(1)

After nitrogen was blown into a solution of 0.15 part NaHSO$_3$ in 200 parts of deionized water for 30 minutes in a reaction vessel, 0.3 part of K$_2$S$_2$O$_8$ was added to the aqueous solution at a temperature of 35° C. To the aqueous solution, a mixture of 100 parts of butyl acrylate, 1 part of benzoyl peroxide and 10.2 parts of Pelex OTP (sulfosuccinate emulsifier; made by Kao Sekken K. K., Japan) was continuously added over a period of two hours. After being stirred for 30 minutes from the completion of the addition, the reaction mixture was heated to a temperature of 100° C. at which temperature the reaction mixture was stirred for three hours to obtain a cross-linked acrylate elastomer polymer, which is listed as No. A–1–1 in Table I. At the time when a temperature of the reaction mixture was raised to 100° C., conversion had already reached 95%, but the desired gel formation had not been observed therein. Whereas, when the reaction was completed, conversion was 98% and degree of cross-linking reached the extent of exhibiting a gel content (hereinafter referred to as GC for short) of 90.5% and a degree of swelling (hereinafter referred to as DS for short) of 10.8.

Using various monomeric mixtures in place of butyl acrylate, the above processes were repeated with all other conditions remaining substantially the same. GC and DS of the resultant polymer and copolymers are shown in Table I.

TABLE I

| Number | Monomer constituent (parts) | GC, percent | DS |
|---|---|---|---|
| A–1–1 | BA (100) | 90.5 | 10.8 |
| A–1–2 | BA/MMA (90/10) | 98.8 | 10.2 |
| A–1–3 | BA/St (90/10) | 92.7 | 11.0 |
| A–1–4 | BA/AN (90/10) | 93.0 | 10.1 |

NOTE.—BA=Butyl acrylate; St=Styrene; MMA=Methyl methacrylate; AN=Acrylonitrile.

Preparation of cross-linked acrylate elastomer polymer or copolymer components (A)–(2)

A mixture of 81 parts of butyl acrylate, 9 parts of methyl methacrylate and 24 parts of Pelex OTP was continuously added for two hours to 195 parts of an aqueous solution containing 0.13 part of K$_2$S$_2$O$_8$ and maintained at a temperature of 70° C. To the uncross-linked elastomer latex thus obtained, a mixed solution of 9 parts of butyl acrylate, 1 part of methyl methacrylate and 1 part of benzoyl peroxide was added at a temperature of 35° C. and stirred for two hours. 5 parts of an aqueous 4% K$_2$S$_2$O$_8$ solution was then added to the mixture. Finally, the mixture was stirred at a temperature of 95° C. for three hours to obtain a cross-linked acrylate elastomer copolymer (listed as No. A–2–2 in Table II). The copolymer exhibited GC of 93.5% and DS of 10.1.

Using various monomers in place of the mixture of butyl acrylate and methyl methacrylate, the above processes were repeated with all other conditions remaining the same. Results are shown in Table II.

TABLE II

| Number | Monomer constituent (parts) | GC, percent | DS |
|---|---|---|---|
| A–2–1 | BA (100) | 90.0 | 10.5 |
| A–2–2 | BA/MMA (90/10) | 98.1 | 9.9 |
| A–2–3 | BA/St (90/10) | 92.8 | 11.0 |
| A–2–4 | BA/AN (90/10) | 93.1 | 10.0 |

Preparation of resinous compositions

A mixture of 300 parts of the latex A–1–1 (solid content of which was 100 parts) and 600 parts of deionized water was blown with nitrogen for 30 minutes and followed by the addition of a solution of 0.30 part Rongalit (formaldehyde sodium sulfoxylate, made by Wako Junyaku K. K., Japan) in 10 parts of water while the reaction mixture was maintained at a temperature of 85° C. To the reaction mixture, a mixed solution of 0.60 part of Percumyl P (diisopropyl-benzene hydroperoxide, made by Nihon Yushi K. K., Japan), 40 parts of butyl acrylate and 60 parts of methyl methacrylate was then added by degrees for one hour. After the completion of the addition, the reaction mixture was stirred for 30 minutes.

To the reaction mixture, a solution of 0.10 part Rongalit in 10 parts of water was added and successively a mixed solution of 0.8 part of Percumyl P, 10 parts of butyl acrylate, 190 parts of methyl methacrylate and 0.40 part of octyl mercaptan was added by degrees for two hours while the reaction mixture was maintained at a temperature of 85° C. After the addition of the mixed solution was completed, the reaction mixture was maintained at a temperature of 85° C. for one hour to substantially complete the polymerization. A latex, thus obtained, was coagulated in a normal manner to precipitate polymer. After being filtered and washed, the polymer was completely dried and pelletized. The pellet was melt-extruded by an inflation method to form films having a thickness of 80μ.

Characteristics of the films were as follows: tensile strength (JIS Z–1702), 252 kg./cm.$^2$; elongation (JIS Z–1702), 145%; haze (ASTM D1003–61), 10.2; Elemendorf tearing strength (JIS P–8116), 3.67 kg./cm. In the case where the film was tested for weather resistance using a weather-meter, the film retained 92% of the original elongation after a 500 hour exposure.

Employing various mixed proportions of butyl acrylate to methyl methacrylate in place of the above proportion, above processes were repeated with all other conditions remaining the same. Characteristics of the resultant films are shown in Table III.

TABLE III

| Exp. No. | Composition of resin | | | Tensile strength, kg./cm.² | Elongation, percent | Haze, percent | Elemendorf tearing strength, kg./cm. |
|---|---|---|---|---|---|---|---|
| | Component (A) (parts) | Component (B) (parts) | Component (C) (parts) | | | | |
| 1-1 | A-1-1 (100) | BA/MMA (40/60) | BA/MMA (10/190) | 252 | 145 | 10.2 | 3.67 |
| 1-2 | A-1-2 (100) | BA/MMA (40/60) | BA/MMA (10/190) | 230 | 175 | 5.7 | 3.49 |
| 1-3 | A-1-3 (100) | BA/MMA (40/60) | BA/MMA (10/190) | 224 | 126 | | |
| 1-4 | A-1-4 (100) | BA/MMA (40/60) | BA/MMA (10/190) | 234 | 104 | 27.6 | 3.96 |
| 1-5 | A-2-1 (100) | BA/MMA (40/60) | BA/MMA (10/160) | 255 | 150 | 9.8 | |
| 1-6 | A-1-2 (100) | BA/MMA (10/60) | BA/MMA (10/190) | 392 | 65.2 | 6.8 | |
| 1-7 | A-1-2 (100) | BA/MMA (20/80) | BA/MMA (10/190) | 372 | 66.1 | 6.1 | |
| 1-8 | A-1-2 (100) | BA/MMA (30/70) | BA/MMA (10/190) | 315 | 72.0 | 5.2 | |
| 1-9 | A-1-2 (60) | BA/MMA (24/36) | BA/MMA (14/296) | 376 | 24.2 | 8.1 | |
| 1-10 | A-1-2 (80) | BA/MMA (32/48) | BA/MMA (12/228) | 281 | 71.8 | 7.8 | |
| 1-11 | A-1-2 (120) | BA/MMA (48/72) | BA/MMA (8/152) | 194 | 162.8 | 5.7 | |
| 1-12 | A-1-2 (140) | BA/MMA (56/84) | BA/MMA (6/114) | 163 | 203.3 | 6.6 | |

CONTROL EXAMPLE 1

A process of Exp. No. 1 in Example 1 was repeated under the same conditions as those in Example 1 except that polymer component (A) was prepared without employing any cross-linking agents such as organic peroxides.

Resultant film having a thickness of 80μ were characterized as having a tensile strength of 240 kg./cm.², an elongation of 70.6%, a haze of 69.6% and an Elemendorf tearing strength of 2.50 kg./cm. Apparently, a polymer component (A) having no cross-linkage results in films possessing a considerably increased haze.

EXAMPLE 2

After nitrogen was blown into 200 parts of aqueous 0.15 part $(NH_4)_2S_2O_8$ solutions, a mixture of 90 parts of butyl acrylate, 190 parts of methyl methacrylate and 0.40 part of octyl mercaptan was added by degrees for two hours while the reaction mixture was maintained at a temperature of 85° C. After the addition of the mixed solution was completed, the reaction mixture was maintained at a temperature of 85° C. for one hour to substantially complete the polymerization. Latex, thus obtained, was coagulated in a normal manner to precipitate polymer. After being filtered and washed, the polymer was completely dried and pelletized. The pellet was melt-extruded by an inflation method to form films having a thickness of 80μ. Characteristics of the resultant films are shown in Table IV. In the case where these films were tested for weather resistance using a weather-meter, each film retained more than 90% of its original elongation after a 500 hour exposure.

TABLE IV

| Exp. No. | Cross-linking agents (parts) | Characteristics of polymer components (A) | | Characteristics of films | | | |
|---|---|---|---|---|---|---|---|
| | | DS | GC, percent | Tensile strength, kg./cm.² | Elongation, percent | Elemendorf tearing strength, kg./cm. | Haze, percent |
| 2-1 | TAC (0.5) | 10.0 | 94.0 | 255 | 140 | 3.0 | 7.1 |
| 2-2 | TAP (0.5) | 9.8 | 94.2 | 240 | 120 | 2.9 | 6.8 |
| 2-3 | AMA (1.0) | 10.0 | 93.5 | 242 | 130 | 2.8 | 6.5 |
| 2-4 | TEDMA (6.0) | 8.7 | 93.1 | 240 | 150 | 3.2 | 6.1 |

NOTE.—TAC=Triallyl cyanurate; TAP=Triallyl phosphate; AMA=Allyl methacrylate; TEDMA=Tetraethylene glycol dimethacrylate.

acrylate, 10 parts of methyl methacrylate, 3 parts of Pelex OTP and each amount of polyfunctional monomer as listed in Table IV was continuously added for two hours to the aqueous solution maintained at a temperature of 70° C. Polymerization was performed for 30 minutes after the ending of the addition to obtain copolymer component (A) latex, which component was characterized as having both DS and GC values as listed in Table IV, with a conversion of more than 97%.

600 parts of deionized water, thoroughly blown with nitrogen, was added to the polymer component (A) latex, followed by the addition of a solution of 0.30 part Rongalit in 10 parts of water while the reaction mixture was maintained at a temperature of 85° C. To the reaction mixture, a mixed solution of 0.60 part of Percumyl P, 40 parts of butyl acrylate and 60 parts of methyl methacrylate was then added by degrees for one hour. After the completion of the addition, the reaction mixture was stirred for 30 minutes.

Further, to the reaction mixture, solution of 0.10 part Rongalit in 10 parts of water was added and successively, a mixed solution of 0.4 part of Percumyl P, 10 parts of

CONTROL EXAMPLE 2

A process of Example 2 was repeated under the same conditions as those in Example 2 except that polymer component (A) was prepared without employing any cross-linking agents.

Resultant films having a thickness of 80μ were characterized as having a tensile strength of 242 kg./cm.², an elongation of 77.6%, a haze of 70.0% and an Elemendorf tearing strength of 2.50 kg./cm. Apparently, a polymer component (A) not having cross-linkage results in films possessing a considerably increased haze.

EXAMPLE 3

Using various monomers and polyfunctional monomers (cross-linking agents), as listed in Table V, processes of Example 2 were repeated with all conditions remaining the same to obtain copolymer components (A), DS and GC of which were shown in Table V.

Using the copolymer components (A), succeeding polymerizations and film-forming processes were carried out in the same manner as that of Example 2. Characteristics of the resultant films are shown in Table V.

TABLE V

| Exp. No. | Composition of copolymer components (A) (percent) | Cross-linking agent (parts) | Characteristics of polymer components (A) | | Characteristics of films | | |
|---|---|---|---|---|---|---|---|
| | | | DS | GC, percent | Tensile strength, kg./cm.² | Elongation, percent | Haze, percent |
| 3-1 | BA/MMA (90/10) | TAC (1.0) | 7.8 | 94.1 | 240 | 155 | 7.2 |
| 3-2 | BA/MMA (95/5) | TAC (1.5) | 6.1 | 95.3 | 251 | 162 | 7.1 |
| 3-3 | BA (100) | TAC (2.0) | 4.1 | 93.8 | 265 | 130 | 10.1 |
| 3-4 | BA (100) | EDMA (10.0) | 4.9 | 91.6 | 268 | 170 | 11.2 |
| 3-5 | BA (100) | TAC/EDMA (1.0/4.0) | 4.0 | 93.6 | 270 | 172 | 10.3 |
| 3-6 | BA/BMA (70/30) | TAC/EDMA (1.0/4.0) | 4.5 | 93.5 | 255 | 140 | 5.2 |
| 3-7 | EHA/MMA (95/5) | DAP/EDMA (1.0/5.0) | 5.5 | 94.7 | 270 | 157 | 7.1 |
| 3-8 | BA/MMA (95/5) | EDMA/AMA (3.0/2.0) | 4.8 | 93.5 | 272 | 162 | 6.0 |

Note.—BMA=Butyl methacrylate; EMA=2-ethylhexyl methacrylate; EDMA=Ethylene glycol dimethacrylate; DAP=Diallyl phthalate.

EXAMPLE 4

After sufficient amounts of nitrogen were blown into 200 parts of an aqueous 0.10 part $(NH_4)_2S_2O_8$ solution, a mixture of 90 parts of butyl acrylate, 6 parts of methyl methacrylate, 4 parts of ethylene glycol dimethacrylate, 0.5 part of triallyl cyanurate and 2 parts of Pelex OTP was continuously trickled for one hour into the aqueous solution maintained at a temperature of 70° C. After the completion of the trickling, polymerization was performed at a temperature of 70° C. for 30 minutes to obtain a copolymer component (A), which was characterized as having DS of 5.5 and GC of 92.0%, with a conversion of more than 97%.

Using various amounts of the copolymer component (A), succeeding polymerizations and film-forming processes were carried out in the same manner as that of Example 2. Characteristics of the resultant films are shown in Table VI.

EXAMPLE 6

After nitrogen was blown into a solution of 0.15 part $NaHSO_3$ in 200 parts of deionized water for more than 30 minutes in a reaction vessel, 0.3 part of $K_2S_2O_8$ was added to the aqueous solution. Then, a mixture of 90 parts of butyl acrylate, 10 parts of methylmethacrylate, 2 parts of ethyl glycol dimethacrylate, 0.5 part of benzoyl peroxide and 2 parts of Pelex OTP as continuously added to the solution for two hours. The reaction mixture was continuously stirred for 30 minutes after the ending of the addition and successively, heated to a temperature of 100° C., at which temperature the mixture was continuously stirred for two hours to obtain a copolymer component (A). The copolymer component (A) was characterized as having DS of 8.9 and GC of 90.1%.

Using the copolymer component (A), succeeding polymerizations and film-forming process were carried out in the same manner as that of Example 2. Films, thus

TABLE VI

| Example number | Composition of resins | | | Characteristics of films | | |
|---|---|---|---|---|---|---|
| | (A) (parts) | (B) (parts) | (C) (parts) | Tensile strength, kg./cm.² | Elongation, percent | Haze, percent |
| 4-1 | 15 | BA/MMA (6/9) | BA/MMA (3.5/66.5) | 375 | 24 | 8.0 |
| 4-2 | 20 | BA/MMA (8/12) | BA/MMA (3/57) | 280 | 72 | 7.5 |
| 4-3 | 25 | BA/MMA (10/15) | BA/MMA (2.5/47.5) | 229 | 176 | 5.5 |
| 4-4 | 30 | BA/MMA (12/18) | BA/MMA 2.0/38) | 193 | 163 | 5.7 |
| 4-5 | 35 | BA/MMA (14/21) | BA/MMA (1.5/28.5) | 162 | 203 | 7.0 |

EXAMPLE 5

A mixture of 95 parts of butyl acrylate, 5 parts of methyl methacrylate, 1.5 parts of triallyl cyanurate and 3 parts of Pelex OTP was treated in the same manner as that of Example 2 to obtain a copolymer component (A), which was characterized as having GC of 95.3% and DS of 6.1.

After 600 parts of deionized water and then 0.15 part of Rongalit were added to the copolymer component (A) latex in the same manner as that in Example 2 while the latex was maintained at a temperature of 85° C., a mixed solution of 0.30 part of Percumyl P, 40 parts of butyl acrylate and 60 parts of methyl methacrylate was added to the reaction mixture by degrees for one hour. After the completion of the reaction, to the reaction mixture, 0.10 part of Rongalit was further added and successively, a mixed solution of 0.4 part of Percumyl P, 5 parts of butyl acrylate, 185 parts of methyl methacrylate, 10 parts of methacrylic acid and 0.60 part of n-dodecyl mercaptan was added by degrees for one hour while the reaction mixture was maintained at a temperature of 85° C. Latex, thus polymerized, was treated in the same manner as that of Example 2. Resultant films having a thickness of 80μ were characterized as having a tensile strength of 260 kg./cm.², an elongation of 172%, an Elemendorf tearing strength of 3.1 kg./cm. and a haze of 5.1%. In the case where the films were tested for weather resistance in the same manner as that in Example 2, they retained more than 92% of their original elongation after a 500 hour exposure.

obtained, were characterized as having a tensile strength of 251 kg./cm.², an elongation of 120%, a haze of 7.1% and an Elemendorf tearing strength of 2.55 kg./cm.

EXAMPLE 7

A mixture of 81 parts of butyl acrylate, 9 parts of methyl methacrylate, 0.3 part of triallyl cyanurate and 2 parts of Pelex OTP was continuously added for two hours to 195 parts of an aqueous 0.13 part $K_2S_2O_8$ solution, maintained at a temperature of 70° C., to obtain a copolymer latex. To the latex, a mixture of 9 parts of butyl acrylate, 1 part of methyl methacrylate and 1 part of benzoyl peroxide was added at a temperature of 35° C., followed by the agitation for two hours. After 5 parts of an aqueous 4% $K_2S_2O_8$ solution was added to the reaction mixture, the mixture was stirred at a temperature of 95° C. for three hours to obtain a copolymer component (A), which as characterized as having GC of 95.1% and DS of 7.1.

Using the copolymer component (A), succeeding polymerizations and film-forming process were carried out in the same manner as that of Example 2. Resultant films were characterized as having a tensile strength of 272 kg./cm.², an elongation of 190% and a haze of 6.2%.

EXAMPLE 8

Sufficient amounts of nitrogen were blown into 200 parts of an aqueous 0.15 part $(NH_4)_2S_2O_8$ solution. To the aqueous solution, maintained at a temperature of 70° C., a mixture of 90 parts of butyl acrylate, 10 parts of methyl methacrylate, 3 parts of Pelex OTP and 0.5 part of triallyl cyanurate was continuously added for two hours. After the completion of the addition, polymerization was performed for 30 minutes to obtain a copolymer component (A), which was characterized as having GC of 94.0% and DS of 10.0, with a conversion of more than 97%.

600 parts of deionized water, sufficiently blown with nitrogen, was added to the copolymer component (A) latex, followed by the addition of 0.10 part of Rongalit in 10 parts of water while the reaction system was maintained at a temperature of 85° C. Thereafter, a mixed solution of 0.2 part of Percumyl P, 40 parts of butyl acrylate, 60 parts of methyl methacrylate and 0.1 part of octyl mercaptan was added by degrees for 1 hour, followed by the agitation for 30 minutes after the completion of the addition.

Further, 0.10 part of Rongalit in 10 parts of water was added to the reaction system. A mixed solution of 0.80 part of Percumyl P, 10 parts of butyl acrylate, 190 parts of methyl methacrylate and 0.40 part of octyl mercaptan was then added by degrees for two hours while the reaction system was maintained at a temperature of 85° C. Reaction was performed at the same temperature for one hour after the completion of the addition to substantially complete polymerization. Latex, thus obtained, was coagulated in a normal manner to precipitate a polymeric product. After being filtered and washed the polymeric product was completely dried and pelletized. The pellet was melt-extruded by an inflation method to form films having a thickness of 80μ. Characteristics of the resultant films are shown in Table VII.

EXAMPLE 9

A process of Example 8 was repeated under the same conditions as those in Example 8 except that the second stage polymerization (for the preparation of a copolymer component (B)) was performed using 0.6 part of Rongalit and 1.2 parts of Percumyl P in place of 0.10 part and 0.20 part, respectively, but without using any chain transfer agents. A stronger, more offensive smell was given off during the film-forming process from the resultant resin in comparison with that in Example 8. Characteristics of the resultant films are shown in Table VII.

EXAMPLE 10

A mixture of 95 parts of butyl acrylate, 5 parts of methyl methacrylate, 1.5 parts of triallyl cyanurate and 3 parts of Pelex OTP was treated in the same manner as that of Example 8 to obtain a copolymer component (A) latex, which component was characterized as having GC of 95.3% and DS of 6.1.

To the latex, 600 parts of deionized water and 0.10 part of Rongalit were successively added in the same manner as that of Example 8 while the reaction system was maintained at a temperature of 85° C. Then, a mixture of 0.20 part of Percumyl P, 40 parts of butyl acrylate, 60 parts of methyl methacrylate and 0.2 part of n-dodecyl mercaptan was added by degrees for one hour.

After the reaction was completed, 0.10 part of Rongalit was further added to the reaction system. A mixture of 0.80 part of Percumyl P, 5 parts of butyl acrylate, 185 parts of methyl methacrylate, 10 parts of methacrylic acid and 0.60 part of n-dodecyl mercaptan was then added by degrees for one hour while the reaction system was maintained at a temperature of 85° C. A copolymer latex, thus obtained, was treated in the same manner as that in Example 8. Films, finally obtained, exhibited such characteristics as shown in Table VII. Only a very slight bad smell was given off during the film-forming process.

TABLE VII

| | Composition of resins | | | Characteristics of films | | | | |
|---|---|---|---|---|---|---|---|---|
| Exp. No. | (A) (parts) | (B) (parts) | (C) (parts) | Tensile strength, kg./cm.² | Elongation, percent | Elemendorf tearing strength, kg./cm. | Haze, percent | Elongation retention,[1] percent |
| 8 | BA/MMA (90/10) | BA/MMA (40/60) | BA/MMA (10/190) | 270 | 140 | 3.0 | 5.0 | 98 |
| 9 | BA/MMA (90/10) | BA/MMA (40/60) | BA/MMA (10/190) | 250 | 130 | 2.5 | | 70 |
| 10 | BA/MMA (95/5) | BA/MMA (40/60) | BA/MMA/MA (5/185/10) | 260 | 172 | 3.1 | 5.1 | 96 |

[1] An elongation retention to the original elongation after a 500 hour exposure in a weather-meter.

NOTE.—MA=Methacrylic acid

EXAMPLE 11

After being sufficiently blown with nitrogen, a mixture of 90 parts of butyl acrylate, 10 parts of methyl methacrylate, 3 parts of Pelex OTP and predetermined amounts of a polyfunctional monomer, listed as a cross-linking agent in Table VIII, was continuously added over a period of two hours to 200 parts of an aqueous 0.15 part $(NH_4)_2S_2O_8$ solution, maintained at a temperature of 70° C. After the completion of the addition, polymerization was performed for 30 minutes to obtain a copolymer component (A), characteristics of which are shown in Table VIII, with a conversion of more than 97%.

600 parts of deionized water, sufficiently blown with nitrogen, was added to the copolymer component (A) latex, followed by the addition of 0.30 part of Rongalit in 10 parts of water while the reaction system was maintained at a temperature of 85° C. Thereafter, a mixed solution of 0.60 part of Percumyl P, 40 parts of butyl acrylate and 60 parts of methyl methacrylate was added by degrees over a period of one hour, followed by the agitation for 30 minutes after the completion of the addition.

Further, 0.2 part of Rongalit in 10 parts of water was added to the reaction system. A mixed solution of 0.80 part of Percumyl P, 10 parts of butyl acrylate, 190 parts of methyl methacrylate and 0.50 part of octyl mercaptan was added by degrees for a period of two hours while the reaction system was maintained at a temperature of 85° C. Reaction was performed at a temperature of 85° C. for one hour to substantially complete polymerization. A latex, thus obtained, was coagulated in a normal manner to precipitate a polymer product. The polymeric product was filtered, washed and then completely dried.

400 parts of the polymeric product and 20 parts of polyvinylidene fluoride Kynar 500 (Pennsalt Chemical Corp.) were blended by a Henschel mixer, after which the mixture was extruded through a screw-type extruder to pellets. The pellets were extruded by an inflation method to form films having a thickness of 80μ. Characteristics of the resultant films are shown in Table VIII.

TABLE VIII

| Exp. No. | Crosslinking agent (parts) | Characteristics of polymer components (A) | | Characteristics of films | | | | |
|---|---|---|---|---|---|---|---|---|
| | | DS | GC, percent | Tension strength, kg./cm.² | Elongation, percent | Impact strength,[1] g. | Haze, percent | Elongation retention,[2] percent |
| 11-1 | TAC (0.5) | 10.0 | 94.0 | 300 | 140 | 650 | 6.5 | 90 |
| 11-2 | DAP (0.5) | 9.8 | 94.2 | 290 | 120 | 600 | 5.2 | 90 |
| 11-3 | AMA (1.0) | 10.0 | 93.5 | 289 | 130 | 620 | 5.3 | 90 |
| 11-4 | TEDMA (15) | 8.7 | 93.1 | 290 | 150 | 662 | 5.0 | 90 |
| 11-5 [3] | TAC (0.5) | 10.0 | 94.0 | 225 | 130 | 221 | 10.0 | 83 |
| C-3 [4] | | | 0 | 242 | 77.6 | 520 | 70.0 | 81 |

[1] Impact strength determined by the free falling dart method (according to ASTM D1709-62T).
[2] The original elongation retention after a 1,000 hour exposure in a weather-meter.
[3] Polyvinylidene fluoride was not incorporated into the polymeric product. It is apparent from the table that the film (11-5) exhibits an inferior impact resistance to that of being incorporated with polyvinylidene fluoride.
[4] Control Example 3, wherein a process of Example 11 was repeated under the same conditions as those in Example 11 except for not using any cross-linking agents in a stage of preparing a polymer component (A). As is apparent from the table, a copolymer component (A) not having cross-linkages results in films possessing a considerably increased haze.

EXAMPLE 12

Using a triallyl cyanurate as a cross-linking agent in amounts of 1.0 part based on 100 parts of the copolymer component (A), a process of Example 11 was repeated with all other conditions remaining the same. The resultant acrylic copolymers were blended with Kynar-500, mixed amounts of which to 100 parts of the copolymers were varied as shown in Table IX, and extruded into films having a thickness of 80μ. Characteristics of the films are shown in Table IX.

TABLE IX

| Example No. | Kynar-500, parts | Tensile strenght, kg./cm.² | Elongation, percent | Impact strength, g. | Haze, percent | Elongation* retention, percent |
|---|---|---|---|---|---|---|
| 12-1 | 5 | 292 | 140 | 610 | 5.4 | 91 |
| 12-2 | 10 | 300 | 151 | 620 | 4.8 | 91 |
| 12-3 | 15 | 307 | 153 | 610 | 5.1 | 92 |
| 12-4 | 20 | 310 | 170 | 700 | 5.0 | 93 |

*The original elongation retention after a 1,000 hour exposure in a weather-meter.

What we claim is:

1. An acrylic resinous composition consisting essentially of
    (A) 5 to 35% by weight, based on the weight of said acrylic resinous composition, of a polymer or copolymer component prepared by emulsion polymerization containing, in polymerized form, 60 to 100% by weight of at least one alkyl acrylate, the alkyl group having 1 to 8 carbon atoms, and 0 to 40% by weight of at least one copolymerizable monofunctional vinyl or vinylidene monomer, and being cross-linked with a cross-linking agent to the extent of exhibiting a swelling degree of 3 to 15 and a gel content of no less than 80%,
    (B) 1 to 70% by weight, based on the weight of said acrylic resinous composition, of a copolymer component being prepared by polymerizing in an emulsion state without further addition of an emulsifier a mixture of 10 to 60% by weight of at least one alkyl acrylate, the alkyl group having 1 to 8 carbon atoms, 40 to 90% by weight of at least one alkyl methacrylate, the alkyl group having 1 to 4 carbon atoms, and 0 to 20% by weight of at least one copolymerizable vinyl or vinylidene monomer in the presence of said polymer or copolymer component (A), and
    (C) the remainder of a polymer or copolymer component being prepared by polymerizing in an emulsion state without further addition of an emulsifier a mixture of 60 to 100% by weight of at least one alkyl methacrylate, the alkyl group having 1 to 4 carbon atoms, and 0 to 40% by weight of at least one copolymerizable monofunctional vinyl or vinylidene monomer in the presence of both said polymer or copolymer component (A) and said copolymer component (B).

2. An acrylic resinous composition consisting essentially of
    (A) 5 to 35% by weight, based on the weight of said acrylic resinous composition, of a polymer or copolymer component prepared by an emulsion polymerization procedure containing, in polymerized form, 80 to 100% by weight of at least one alkyl acrylate, the alkyl group having 1 to 8 carbon atoms, and 0 to 20% by weight of at least one copolymerizable monofunctional vinyl or vinylidene monomer, and being cross-linked with a cross-linking agent to the extent of exhibiting a swelling degree of 3 to 15 and a gel content of no less than 80%,
    (B) 5 to 50% by weight, based on the weight of said acrylic resinous composition, of a copolymer component being prepared by polymerizing in an emulsion state without further addition of an emulsifier a mixture of 20 to 60% by weight of at least one alkyl acrylate, the alkyl group having 1 to 8 carbon atoms, 40 to 80% by weight of at least one alkyl methacrylate, the alkyl group having 1 to 4 carbon atoms, and 0 to 20% by weight of at least one copolymerizable vinyl or vinylidene monomer in the presence of said polymer or copolymer component (A), and
    (C) the remainder of a polymer or copolymer component being prepared by polymerizing in an emulsion state without further addition of an emulsifier a mixture of 85 to 100% by weight of at least one alkyl methacrylate, the alkyl group having 1 to 4 carbon atoms, and 0 to 15% by weight of at least one copolymerizable monofunctional vinyl or vinylidene monomer in the presence of both said polymer or copolymer component (A) and said copolymer component (B).

3. An acrylic resinous composition according to claim 1, wherein said cross-linking agent is at least one member selected from peroxides and polyfunctional monomers having two or more nonconjugated $>C=C<$ groups in the molecule.

4. An acrylic resinous composition according to claim 3, wherein said peroxides are an oil-soluble organic peroxide and used in amounts of 0.3 to 3.0 parts by weight to 100 parts by weight of a total of said alkyl acrylate and said monofunctional vinyl or vinylidene monomer.

5. An acrylic resinous composition according to claim 3, wherein said polyfunctional monomers having two or more non-conjugated $>C=C<$ groups in the molecule are at least one member selected from triallyl phosphate, trimethylol propane trimethacrylate, allyl acrylate, diallyl phthalate, triallyl cyanurate and triallyl isocynurate, and used in amounts of 0.2 to 15 parts by weight to 100 parts by weight of a total of said alkyl acrylate and said monofunctional vinyl or vinylidene monomers.

6. An acrylic resinous composition according to claim 1, wherein said copolymerizable monofunctional vinyl or vinylidene monomer contained in said copolymer component (A) is a member selected from methacrylic acid, alkyl methacrylate which alkyl group has 1 to 12 carbon atoms, dialkyl itaconate which alkyl group has 1 to 10 carbon atoms, acrylonitrile, methacrylonitrile, vinylidene chloride, vinyl chloride, styrene, alkyl-substituted styrene.

7. An acrylic resinous composition according to claim 1, wherein said copolymerizable monofunctional monomer used in the preparation of said copolymer component (C) is a member selected from acrylic acid, alkyl acrylate which alkyl group has 1 to 12 carbon atoms, dialkyl itaconate which alkyl group has 1 to 10 carbon atoms, acrylonitrile, methacrylonitrile, vinylidene chloride, vinyl chloride, styrene, alkyl-substituted styrene.

8. An acrylic resinous composition according to claim 1, wherein said polymerization for the preparation of polymer or copolymer components (B) and/or (C) is performed in the presence of 0.01 to 2.0 parts by weight, based on 100 parts by weight of a monomer mixture for preparing said components (B) and/or (C), of at least one chain transfer agent.

9. An acrylic resinous composition according to claim 8, wherein said chain transfer agent is one member selected from alkyl mercaptans which alkyl groups has 2 to 20 carbon atoms, mercaptocarboxylic acids, alkyl mercaptocarboxylates which alkyl group has 2 to 12 carbon atoms, benzyl mercaptan and thiophenol.

10. A film or sheet obtained from the acrylic resinous compositions according to claim 1.

References Cited
UNITED STATES PATENTS

| | | | |
|---|---|---|---|
| 3,562,235 | 2/1971 | Ryan | 260—885 |
| 3,678,133 | 7/1972 | Ryan | 260—876 R |
| 3,668,274 | 6/1972 | Owens et al. | 260—857 G |
| 3,502,604 | 3/1970 | Nakatsuka et al. | 260—29.6 |
| 3,448,173 | 6/1969 | Ryan et al. | 260—876 R |

FOREIGN PATENTS

| | | | |
|---|---|---|---|
| 986,865 | 3/1965 | Great Britain | 260—885 |

MURRAY TILLMAN, Primary Examiner

R. B. TURER, Assistant Examiner

U.S. Cl. X.R.

161—218, 251; 260—29.6 RB, 29.6 T, 29.7 UP, 29.7 UA, 884, 876, 886